United States Patent
Abadi et al.

(10) Patent No.: US 10,747,871 B2
(45) Date of Patent: Aug. 18, 2020

(54) SYSTEM AND METHOD FOR PRODUCING SECURE DATA MANAGEMENT SOFTWARE

(71) Applicant: International Business Machines Corporation, Armonk, NY (US)

(72) Inventors: Aharon Abadi, Petah Tikva (IL); Moria Abadi, Petah Tikva (IL); Roie Melamed, Haifa (IL); Aidan Shribman, Ganei Tikva (IL)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 16/013,949

(22) Filed: Jun. 21, 2018

(65) Prior Publication Data
US 2019/0392133 A1    Dec. 26, 2019

(51) Int. Cl.
| | |
|---|---|
| *H04L 29/06* | (2006.01) |
| *G06F 21/51* | (2013.01) |
| *G06F 21/62* | (2013.01) |
| *G06F 9/455* | (2018.01) |

(52) U.S. Cl.
CPC .......... *G06F 21/51* (2013.01); *G06F 21/6245* (2013.01); *G06F 9/45533* (2013.01)

(58) Field of Classification Search
CPC ...................................... G06F 21/51
See application file for complete search history.

(56) References Cited

U.S. PATENT DOCUMENTS

| | | | | |
|---|---|---|---|---|
| 4,688,169 | A * | 8/1987 | Joshi ............... | G06F 21/121 |
| | | | | 726/29 |
| 8,499,351 | B1 * | 7/2013 | Fredericksen .......... | G06F 21/57 |
| | | | | 709/224 |
| 9,235,691 | B2 * | 1/2016 | Mishura ............... | G06F 21/10 |
| 9,275,219 | B2 * | 3/2016 | Cross ............... | H04L 63/102 |
| 10,223,236 | B2 * | 3/2019 | Carey ............... | G06F 11/366 |
| 2007/0061393 | A1 | 3/2007 | Moore | |

(Continued)

FOREIGN PATENT DOCUMENTS

WO    2016094472    6/2016

OTHER PUBLICATIONS

"Reaching Definition Analysis." Department of Computer Science, Purdue University. Nov. 10, 2015. Retrieved from https://www.cs.purdue.edu/homes/ehanau/cs352/supplemental/reachdef.pdf(Year: 2015).*

(Continued)

*Primary Examiner* — Shawnchoy Rahman
(74) *Attorney, Agent, or Firm* — Roy Melzer (57) ABSTRACT

A system for producing secure data management software, comprising at least one hardware processor adapted to: receive a plurality of data patterns, each comprising at least one data field identifier selected from a set of protected data field identifiers of at least one data repository, at least one output target, and an access instruction; identify in a plurality of computer instructions of the data management software one or more forbidden output instructions by matching one or more reaching definitions of some of the plurality of computer instructions with one or more of the plurality of data patterns; and remove the one or more forbidden output instructions from the plurality of computer instructions.

19 Claims, 5 Drawing Sheets

(56) References Cited

U.S. PATENT DOCUMENTS

| | | | |
|---|---|---|---|
| 2013/0227693 A1* | 8/2013 | Dewey | G06F 9/44 |
| | | | 726/25 |
| 2013/0291060 A1 | 10/2013 | Moore | |
| 2014/0026194 A1 | 1/2014 | Smith | |
| 2014/0380283 A1* | 12/2014 | Hu | G06F 11/3604 |
| | | | 717/132 |
| 2016/0275303 A1 | 9/2016 | Narayanaswamy et al. | |
| 2016/0283301 A1* | 9/2016 | Govindarajalu | G06F 11/079 |
| 2019/0294780 A1* | 9/2019 | Melamed | G06F 21/6245 |

OTHER PUBLICATIONS

Gilmer, "Privacy and security of patient data", www.ibm.com, Oct. 23, 2012. Available at: https://www.ibm.com/developerworks/cloud/library/cl-hipaa/ (retrieved Mar. 7, 2018).

IBM, "IBM Security Guardium". Available at: https://www.ibm.com/security/data-security/guardium (retrieved Mar. 7, 2018).

* cited by examiner

SYSTEM AND METHOD FOR PRODUCING SECURE DATA MANAGEMENT SOFTWARE

BACKGROUND

The present invention, in some embodiments thereof, relates to a data management system and, more specifically, but not exclusively, to a system for managing health information.

There exist reasons to limit access to sensitive electronic information. Some examples of sensitive electronic information are a person's name, a person's address, an identification number such as a passport number, a Social Security number or a national identification number, a bank account identifier, and a health record. Some reasons to limit access to the sensitive electronic information are business related, for example to protect business interests of a business entity. Some other reasons are regulatory, for example regulations governing distribution of and access to health information. An example of a regulation regarding health information is United States Health Insurance Portability and Accountability Act of 1996 (HIPAA).

Some existing data management systems control access to sensitive electronic information by isolating the data management system from other systems. In such systems the sensitive electronic information is stored in dedicated storage devices, and processed by dedicated hardware processors. Some such systems comprise a central database, implementing access control lists to restrict access to data stored in the database. In some such systems only explicitly authorized computers, identified by a network address or a network device port, may retrieve the sensitive electronic information.

The term "cloud computing" refers to delivering one or more hosted services, often over the Internet. Examples of a hosted service delivered over the Internet are a compute resource such as a virtual machine (VM), storage and access to an application. Cloud computing enables an entity such as a company to consume the one or more hosted services as a utility, rather than having to build and maintain computing infrastructures in house. There is an increase in the amount of data management systems implemented using cloud computing for data storage and data management applications. Possible advantages of a cloud implementation of a data management system compared to a system comprising dedicated storage devices and dedicated hardware processing resources include reduced cost of storage and computing resources, simpler storage management, easier expansion, better backup and recovery, and decreased Information Technology (IT) maintenance costs. Cloud computing is characterized by sharing one or more pools of configurable system resources between one or more software applications. A data management system using cloud computing may be susceptible to unintentional or malicious data leaks.

SUMMARY

It is an object of the present invention to provide a system and a method for producing secure data management software.

The foregoing and other objects are achieved by the features of the independent claims. Further implementation forms are apparent from the dependent claims, the description and the figures.

According to a first aspect of the invention, a system for producing secure data management software comprises at least one hardware processor adapted to: receive a plurality of data patterns, each comprising at least one data field identifier selected from a set of protected data field identifiers of at least one data repository, at least one output target, and an access instruction; identify in a plurality of computer instructions of the data management software one or more forbidden output instructions by matching one or more reaching definitions of some of the plurality of computer instructions with one or more of the plurality of data patterns; and remove the one or more forbidden output instructions from the plurality of computer instructions. Removing from the data management software forbidden output instructions exposing identified data from a data repository to unauthorized targets, may help prevent installation of potentially problematic software on a data management system. Using a reaching definition of an output instruction may preserve an association between the output instruction and the source of a value in the output instruction.

According to a second aspect of the invention, a computer implemented method producing secure data management software comprises: receiving a plurality of data patterns, each comprising at least one data field identifier selected from a set of protected data field identifiers of at least one data repository, at least one output target, and an access instruction; identifying in a plurality of computer instructions of the data management software one or more forbidden output instructions by matching one or more reaching definitions of some of the plurality of computer instructions with one or more of the plurality of data patterns; and removing the one or more forbidden output instructions from the plurality of computer instructions.

According to a third aspect of the invention, a software program product for producing secure data management software comprises: a non-transitory computer readable storage medium; first program instructions for receiving a plurality of data patterns, each comprising at least one data field identifier selected from a set of protected data field identifiers of at least one data repository, at least one output target, and an access instruction; second program instructions for identifying in a plurality of computer instructions of the data management software one or more forbidden output instructions by matching one or more reaching definitions of some of the plurality of computer instructions with one or more of the plurality of data patterns; and third program instructions for removing the one or more forbidden output instructions from the plurality of computer instructions; wherein the first, second, and third program instructions are executed by at least one computerized processor from the non-transitory computer readable storage medium.

With reference to the first, second, and third aspects, in a first possible implementation of the first, second, and third aspects of the present invention, identifying the one or more forbidden output instructions comprises: identifying in the plurality of computer instructions one or more output instructions each having an instruction output target; identifying in the plurality of computer instructions one or more protected variables having a value assigned by reading a protected data field from the at least one data repository; applying data-flow analysis to the plurality of computer instructions to identify at least one reaching definition of at least one of the one or more output instructions, each identified reaching definition comprising at least one of the one or more protected variables; identifying at least one suspect output instruction in the at least one of the one or more output instructions having at least one reaching definition comprising at least one of the one or more protected variables, wherein the at least one suspect output instruction has a first instruction output target and the at least one suspect output instruction's at least one reaching definition has a first protected variable; identifying a first protected data field read to assign a value to the first protected variable; and identifying in the plurality of data patterns at least one data pattern having an output target matching the first instruction output target according to a target matching test and a data field identifier matching the first protected data field according to a variable matching test. The at least one data pattern's access instruction forbids access from the first output target to the first protected data field. Identifying a reaching definition of an output instruction and identifying a source of a value of a variable in a reaching definition may preserve an association between the output instruction and the source of a value in the output instruction. Matching a target of an output instruction and an associated data value with a data pattern may facilitate applying an access policy for the target to the data value.

With reference to the first, second, and third aspects, in a second possible implementation of the first, second, and third aspects of the present invention, the at least one hardware processor is further adapted to write the plurality of computer instructions remaining after removing the one or more forbidden output instructions to a digital storage connected to the at least one hardware processor. Storing the plurality of computer instructions may facilitate using the plurality of computer instructions at a future time, and/or more than once.

With reference to the first, second, and third aspects, in a third possible implementation of the first, second, and third aspects of the present invention, the plurality of computer instructions are in a human readable programming language. Optionally, the at least one hardware processor is further adapted to compile the plurality of computer instructions remaining after removing the one or more forbidden output instructions to produce compiled code comprising a plurality of machine language computer instructions or a plurality of intermediate language computer instructions. Compiled code produced by compiling a plurality of computer instructions remaining after removing one or more forbidden output instructions may be less of a threat of exposing sensitive information than other compiled code. Optionally, the at least one hardware processor is further adapted to install the compiled code on at least one other hardware processor of a data management system. Such an implementation facilitates automatic installation, without requiring a human administrator to take action.

With reference to the first, second, and third aspects, or the third possible implementation of the first, second, and third aspects, in a fourth possible implementation of the first, second, and third aspects of the present invention the at least one other hardware processor executes at least one virtual machine. Some cloud implementations of data management systems use virtual machines.

With reference to the first, second, and third aspects, or the third possible implementation of the first, second, and third aspects, in a fifth possible implementation of the first, second, and third aspects of the present invention the at least one other hardware processor is connected to the at least one data repository via at least one other data communication network. Connecting the at least one data repository to the at least one other hardware processor via at least one other data communication network may facilitate a distributed implementation of a data management system.

With reference to the first, second, and third aspects, in a sixth possible implementation of the first, second, and third aspects of the present invention the at least one hardware processor is further adapted to install the plurality of computer instructions remaining after removing the one or more forbidden output instructions on at least one other hardware processor of a data management system. The plurality of computer instructions remaining after removing the one or more forbidden output may be less of a threat of exposing sensitive information than other computer instructions. Such an implementation facilitates automatic installation, without requiring a human administrator to take action.

With reference to the first, second, and third aspects, or the sixth possible implementation of the first, second, and third aspects, in a seventh possible implementation of the first, second, and third aspects of the present invention the at least one other hardware processor executes at least one virtual machine.

With reference to the first, second, and third aspects, or the sixth possible implementation of the first, second, and third aspects, in an eighth possible implementation of the first, second, and third aspects of the present invention the at least one other hardware processor is connected to the at least one data repository via at least one other data communication network.

With reference to the first, second, and third aspects, in a ninth possible implementation of the first, second, and third aspects of the present invention, the at least one output target is a member of a group consisting of: a file name value, a file name template value comprising at least one variable file name element, a network address value, a network address template value comprising at least one variable network address element, and a display device identifier. Any of these targets may expose data to an unauthorized user.

With reference to the first, second, and third aspects, in a tenth possible implementation of the first, second, and third aspects of the present invention, the at least one data field identifier is a member of a group consisting of: an attribute identifier in a relational database table, a key identifier, a column identifier, a document name value, and a document name template value comprising at least one variable document name element. Optionally, the set of protected data field identifiers comprises at least one data field identifier identifying at least one type of protected health information according to Health Insurance Portability and Accountability Act of 1996 (HIPAA) security regulations. Optionally, the set of protected data field identifiers comprises at least one identifier identifying at least one of a group consisting of: a patient name, an address, a Social Security number, a passport number, a national identification number, an electronic mail address, a telephone number, a fingerprint, a photographic image, a medical record, a bank account identifier, and an amount of money.

With reference to the first, second, and third aspects, in an eleventh possible implementation of the first, second, and third aspects of the present invention, the at least one data repository comprises a database.

With reference to the first, second, and third aspects, in a twelfth possible implementation of the first, second, and third aspects of the present invention, the at least one hardware processor receives the plurality of data patterns via a data communication network interface connected to the at least one hardware processor or by reading the plurality of data patterns from a digital storage connected to the at least one hardware processor. Receiving the plurality of data patterns via a data communication network allows modifying an access policy without modifying the system.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to a data management system and, more specifically, but not exclusively, to a system for managing health information.

When sensitive electronic information, for example electronically protected health information (ePHI), is stored and processed by a cloud data management system, retrieval of sensitive electronic information from the cloud data management system discloses the sensitive electronic information outside the boundaries of the cloud. This may be undesirable, for example for business considerations or regulatory and legal considerations. There exist solutions that monitor data at the data storage level, and allow a cloud implemented data management system to retrieve sensitive electronic information from storage only according to user authentication and predefined privileges. However, such systems cannot prevent the cloud implemented data management system from exposing the retrieved sensitive electronic information outside the cloud.

In some systems sensitive electronic information retrieved from the storage is encrypted, however some operations performed on the sensitive electronic information by the data management system require decrypting the sensitive electronic information, enabling the data management system to expose unencrypted sensitive electronic information. Systems that operate only on encrypted data are limited in functionality.

In addition, a data management system may expose sensitive electronic information by writing the sensitive electronic information to a log file or a console. In some cases, such an operation is not part of the data management system's normal functionality but was inserted by a programmer for analyzing or debugging the system and may have been left unintentionally. In some cases, such an operation may be inserted maliciously into a data management system, to bypass network access limitations. As software developed by $3^{rd}$ parties increasingly used by data management systems, there is an increased need to identify such risks of exposing sensitive electronic information.

In some data management systems, sensitive electronic information stored in a data repository is stored in a database. The database is optionally a relational database. In a relational database sensitive electronic information may be stored in one or more identified attributes (also known as fields) of one or more identified tables. The database is optionally a Not Only Structured Query Language (NoSQL) database. In a NoSQL database sensitive electronic information may be stored in one or more identified key identifiers, column identifiers and/or document names.

The present invention, in some embodiments thereof, proposes identifying in the data management software, prior to installing the data management software on the data management system, one or more violations of flow permissions defined using a set of data patterns, and installing on the data management system only data management software that does not violate the flow permissions. In such embodiments the present invention proposes identifying the one or more violations by matching one or more reaching definitions of a plurality of computer instructions of the data management software with the set of data patterns. In some embodiments the present invention is implemented within a software development environment, for example as a compiler plugin or a processing component in an automated software build environment. Optionally, the present invention is implemented within a software configuration management environment, for deploying software.

Optionally, each data pattern of the set of data patterns comprises at least one data field identifier identifying some sensitive electronic information stored in at least one data repository, at least one output target and an access instruction defining allowance or forbiddance of the at least one output target accessing the sensitive electronic information identified by the at least one data field identifier. The present invention proposes, in such embodiments, to identify one or more protected variables having a value assigned by reading sensitive electronic information from the at least one data repository, and to identify for each output instruction of the data management software its reaching definition. A reaching definition for a given instruction is an earlier instruction whose target variable can reach (be assigned to) the given instruction without an intervening assignment. Optionally, one or more data-flow analyses are applied to the data management software to identify the one or more reaching definitions.

An output instruction has an output instruction target. When an output instruction has a reaching definition comprising a protected variable having a value assigned by reading sensitive electronic information from the at least one data repository, there is a risk of the data management system outputting the sensitive electronic information to a target of the output instruction. The sensitive electronic information read from the at least one data repository to assign a value to the protected variable has a data field identifier. However, during runtime, when executing the output instruction, association between output data of the output instruction and a data field identifier of a source of the output data is lost. Optionally, according to the present invention, when a data pattern of the set of data patterns matches a target of the output instruction and the protected variable's data field identifier, the instruction may be forbidden when the data pattern's access instruction forbids the target of the output instruction from receiving data retrieved using the protected variable's data field identifier. Optionally the present invention enables installation of only secure data management software having no forbidden output instructions, and upon identifying one or more forbidden output instructions in data management software the one or more forbidden output instructions are removed from the plurality of instructions prior to installing the data management software. When the present invention is implemented within a software development environment, the present invention facilitates identifying the one or more forbidden output instructions while building the data management software. For example, when the present invention is implemented as a compiler plugin, the compiler plugin may remove the one or more forbidden output instructions from the data management software's source code before compiling the source code into executable machine code. Thus, executable machine code of the secure data management software produced using a compiler with a compiler plugin implemented according to the present invention is more likely to comply with the flow permissions than data management software produced using a compiler without the compiler plugin. In another example, where the present invention is implemented as a processing component in an automated build environment, the processing component may be used to process data management software that is distributed as source files written in a human-readable interpreted language such as JavaScript or Python. In such embodiments the processing component implemented according to the present invention may remove the one or more forbidden output instructions from the source code of the data management before packaging the source code for distribution. Secure data management software produced by an automated build environment executing the processing component is more likely to comply with the flow permissions than data management software produced by an automated build environment without the processing component.

Using data-flow analysis to verify data management software prior to installing the data management software on the data management system allows detection of potential data leaks not identifiable during run time due to loss of runtime association between output data and the data's source. In addition, a system executing data management software verified using the present invention may not have to check for real time access permissions, and thus may respond faster than other systems that do check access permissions in real time during execution.

The present invention may be used for any electronic information requiring access limitations. Some of the following description relates to ePHI but is not limited to health information.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider (ISP)). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
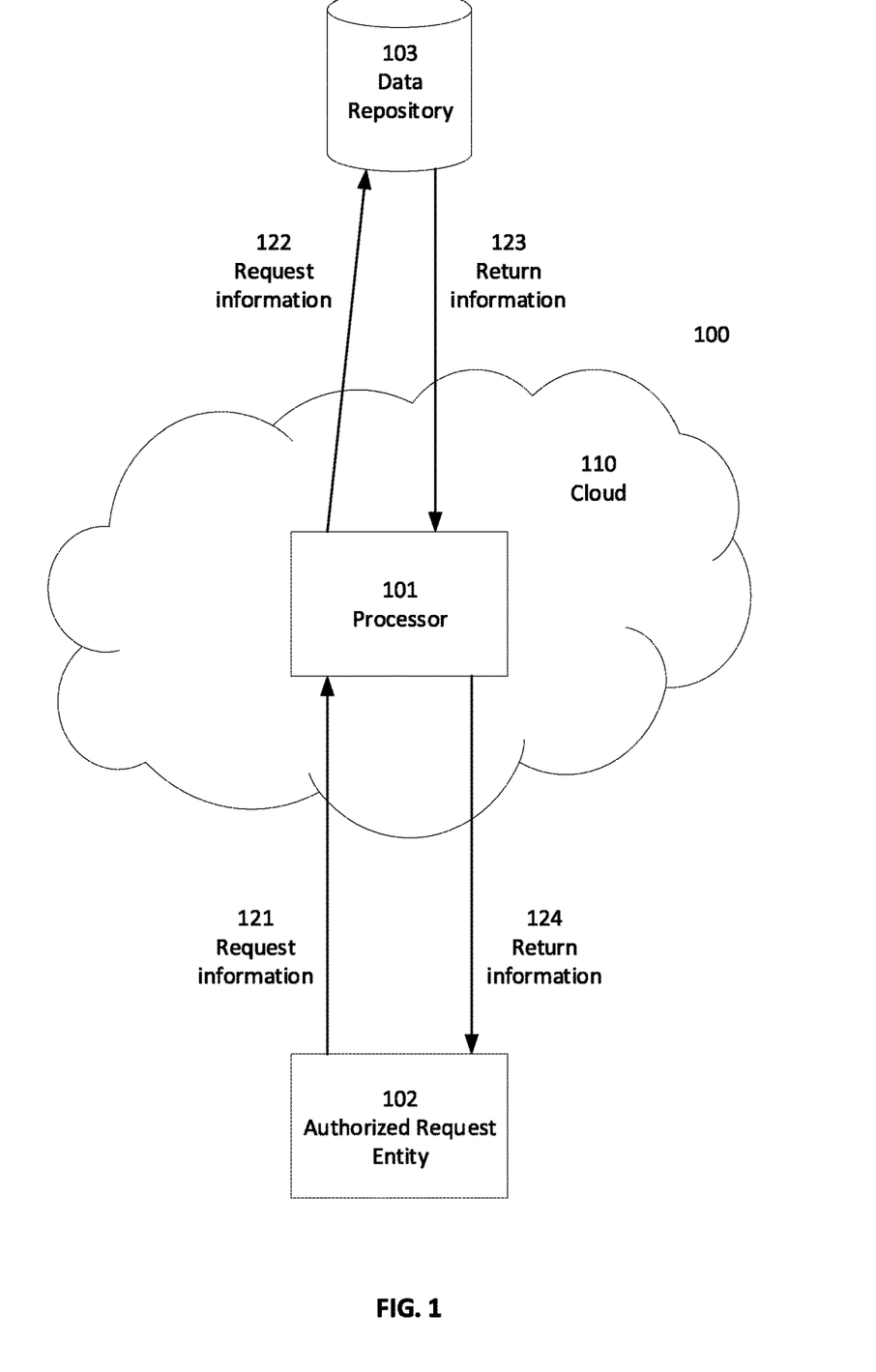
FIG. 1 is a schematic block diagram of an exemplary data management system, according to some embodiments of the present invention.

Reference is now made to FIG. 1, showing a schematic block diagram of an exemplary data management system 100, according to some embodiments of the present invention. Optionally, cloud computing environment 110 comprises at least one data management system hardware processor 101 executing data management software of data management system 100. The data management software comprises a plurality of computer instructions.

For brevity, henceforth the term "data manager" is used to mean at least one data manager system hardware processor. Optionally, data manager 101 executes at least one virtual machine. Optionally, entity 102, authorized to interact with the data management software, sends data manager 101 a request 121 for first information. Entity 102 may be a second hardware processor executing a client software application of data management system 100. Optionally, entity 102 is a second hardware processor executing Hyper Text Transfer Protocol (HTTP) client software and request 121 is a HTTP request message. Optionally, the data management software executed by data manager 101 implements a representational state transfer (REST) interface, optionally using HTTP.

Optionally, data manager 101 is connected to at least one data repository 103, optionally via a data communication network, for example a LAN such as an Ethernet LAN, or a WAN such as the Internet. Upon receiving request 121, data manager 101 optionally sends at least one data repository 103 a request 122 for second information, and optionally at least one data repository 103 sends at least one data management system hardware processor 101 return information 123, according to an optional access policy governing access of software executed by data manager 101 to at least one data repository 103. Returned information 123 from at least one data repository 103 to data manager 101 is still within cloud boundaries and so long as the optional access policy conforms to system 100's security policy regarding external entities, returning information 123 to data manager 101 does not violate system 100's security policy regarding external entities.

Optionally, data manager 101 processes return information 123 and generates a response to entity 102 comprising second return information 124. It may be the case that system 100's security policy regarding external entities prohibits sending some of return information 123 to data manager 101. For example, when entity 102 is an insurance company and return information is ePHI, data manager 101 may be allowed to read from at least one data repository 103 data of a plurality of medical procedures of a certain patient, but may be allowed to send entity 102 only data of one identified medical procedure.

To define system 100's security policy regarding external entities, some embodiments of the present invention use a plurality of data patterns describing data-flow permissions of data from at least one data repository 103 to external entities such as entity 102.

Figure 2:
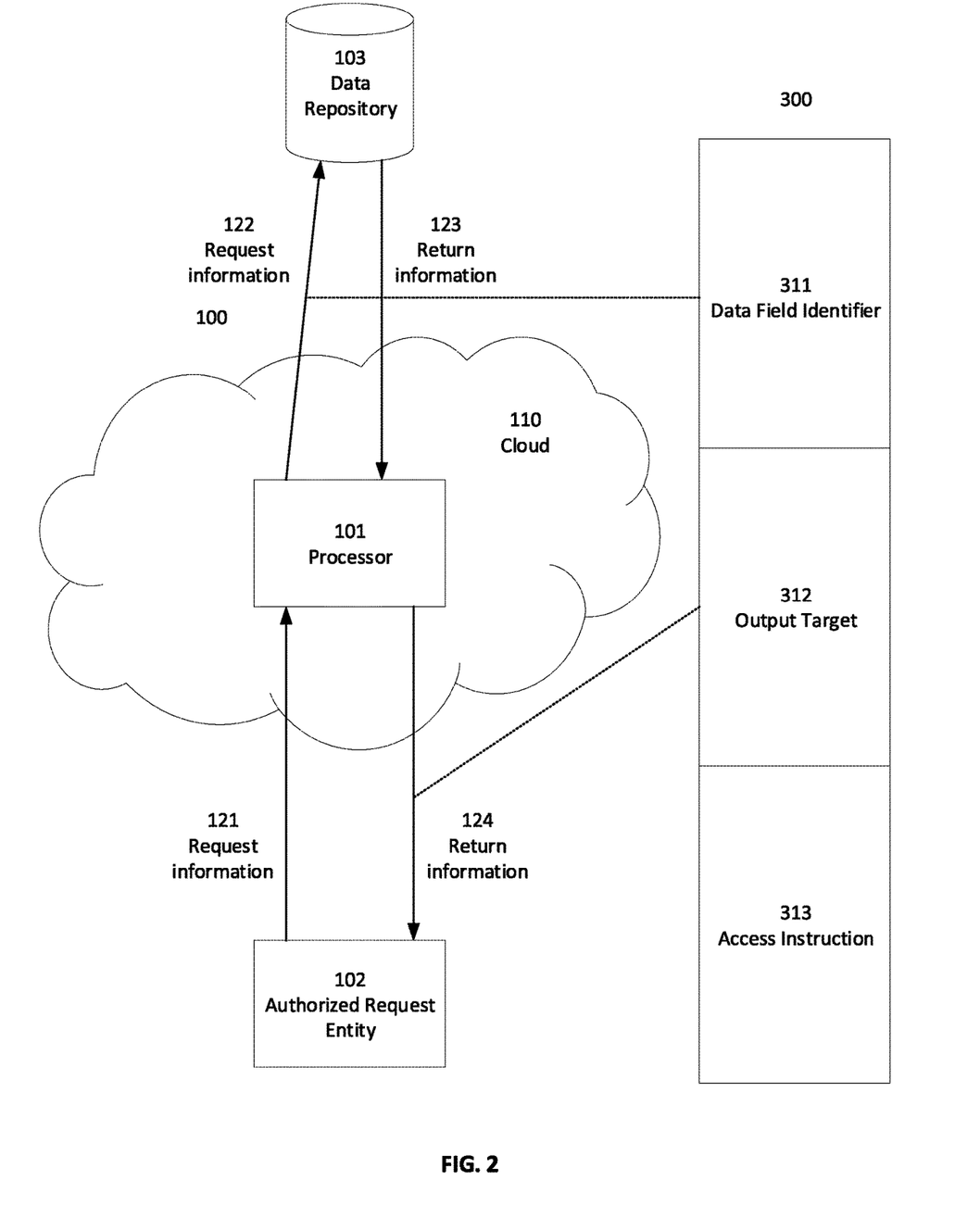
FIG. 2 is a schematic illustration of an exemplary data pattern and its relation to an exemplary data management system, according to some embodiments of the present invention.

Reference is now made also to FIG. 2, showing a schematic illustration of an exemplary data pattern 300 and its relation to exemplary data management system 100, according to some embodiments of the present invention. In such embodiments, each data pattern of the plurality of data patterns comprises at least one data field identifier 311, at least one output target 312 and an access instruction 313. Optionally, at least one data field identifier 311 is selected from a set of protected data field identifiers of data repository 103. Optionally, data repository 103 comprises a database. Optionally, the database is a relational database. An example of a data field identifier when the database is a relational database is an attribute identifier in a database table of the relational database. Optionally, the database is a NoSQL database. Examples of a data field identifier when the database is a NoSQL database are a key identifier of the NoSQL database, a column identifier of the NoSQL database, a document name value and a document name template. A document name template may comprise at least one variable document name element, for example a character representing a wildcard in a document name string value.

When data manager 101 requests information in 122, comprising at least one data field identifier 311, from at least one data repository 103, at least one hardware processor optionally stores a value of at least one data field identifier 311 returned in 123 in at least one variable of the data management software executed by at least one hardware processor 101. When data manager 101 sends second return information 124 to entity 102, at least one hardware processor 101 executes at least one output instruction of the data management software. The at least one output instruction has an instruction output target identifying entity 102.

Optionally, data pattern 300 comprises at least one output target 312. Examples of an output target are a value of a file name, a template value of a filename comprising at least one variable file name element, a value of a network address, a template value of a network address comprising at least one variable network address element, and a display device identifier. A variable file name element may be a character representing a wildcard in a file name string value. A variable network address element may be a character representing a wildcard in a network address string value. Optionally, a file name value identifies a log file. Optionally, a file name template value identifies all files. Optionally, a display device identifier identifies a console display device, connected to data manager 101. Optionally, a network address template identifies a range of network addresses.

Optionally, data pattern 300 comprises an access instruction 313. Optionally, access instruction 313 either allows flow of data retrieved using at least one data field identifier 311 to at least one output target 312 or forbids flow of data retrieved using at least one data field identifier 311 to at least one output target 312. The present invention, in some embodiments thereof, proposes a system and method for identifying an association between return information 123 and second return information 124 and denying installation of data management software where an association between return information 123 and second return information 124 violates a security policy defined by a plurality of data patterns comprising data pattern 300.

An association between return information 123 and second return information 124 is optionally determined by identifying the at least one variable of the data management software, assigned a value from return information 123, in at least one reaching definition of the at least one output instruction executed by at least one hardware processor 101 to send second return information 124 to entity 102. When at least one data field identifier 311 is selected from a set of protected data field identifiers of at least one data repository 103, at least one output target 312 is entity 102 and access instruction 313 forbids flow of data retrieved using at least one data field identifier 311 to at least one output target 312, and in addition the at least one variable of the data management software, assigned a value from return information 123, is identified in at least one reaching definition of the at least one output instruction executed by data manager 101 to send second return information 124 to entity 102, the at least one output instruction is a forbidden output instruction. An example of a protected data field identifier is a data field identifier identifying one of: a patient name, an address, a Social Security number, a passport number, a national identification number, an electronic mail address, a telephone number, a fingerprint, a photographic image, a medical record, a bank account identifier, and an amount of money. Optionally, the set of protected data field identifiers comprises at least one data field identifier identifying at least one type of protected health information according to HIPAA security regulations.

The following description discloses a system and method for producing secure data management software verified to comprise no forbidden output instructions, according to some embodiments of the present invention.

Figure 3:
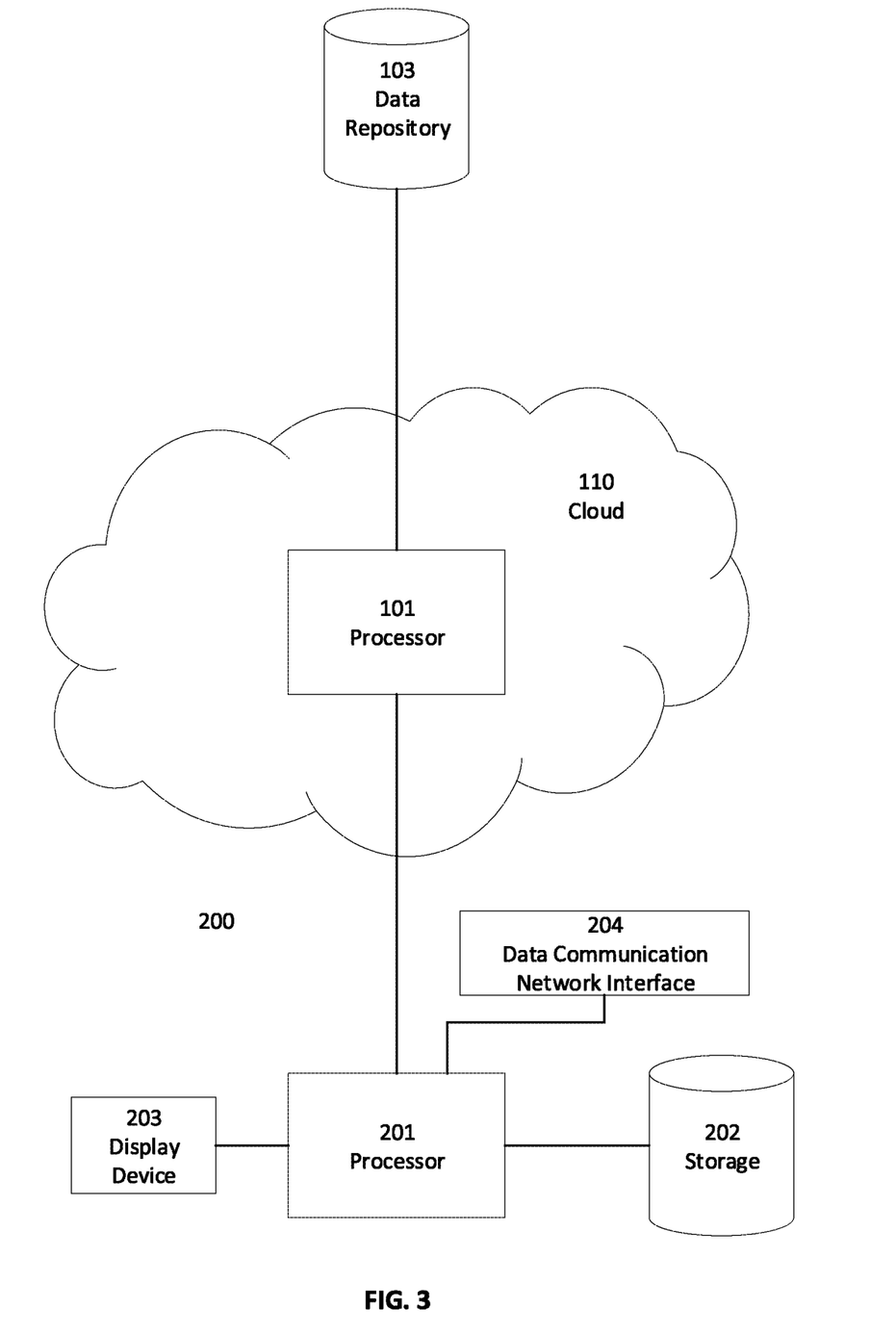
FIG. 3 is a schematic block diagram of an exemplary system for producing secure data management software, according to some embodiments of the present invention.

Reference is now made also to FIG. 3, showing a schematic block diagram of an exemplary system 200 for producing secure data management software, according to some embodiments of the present invention. In such embodiments, at least one other hardware processor 201 executes a computer implemented method for producing secure data management software, and optionally installing the secure data management software on data manager 101.

For clarity, henceforth the term "installer" is used to mean at least one other hardware processor.

Optionally, installer 201 is connected to a digital storage 202, for example a hard disk. Optionally, digital storage 202 is another non-transitory computer readable storage medium, for example non-volatile random-access memory. Optionally, the plurality of data patterns is stored on digital storage 202. Optionally, installer 201 executes a plurality of program instructions stored in digital storage 202. Optionally, installer 201 executes a software development environment, for example a software development environment comprising a compiler or an environment for automatically building and packaging software for distribution. Optionally, installer 201 executes a software configuration management environment. Optionally, installer 201 is connected to at least one data communication network interface 204 for communicating with one or more users of system 200. For example, installer 201 may receive the plurality of data patterns via at least one data communication network interface 204. Optionally, installer 201 sends at least one user of system 200 one or more messages via at least one data communication network interface 204.

Optionally, installer 201 is connected to at least one display device 203, for displaying one or more messages to at least one user of system 200.

Optionally, installer 201 is connected to data manger 101. Optionally, installer 201 is connected to data manager 101 via at least one data communication network interface 204. Optionally, installer 201 is data manager 101.

At least one data communication network interface 204 is optionally a Local Area Network interface such as an Ethernet network interface or a wireless network interface. Optionally at least one other hardware processor 201 is connected to a wide area network, for example the Internet, via at least one data communication network interface 204.

To produce secure data management software system 200, in some embodiments of the present invention, implements the following optional method.

Figure 4:
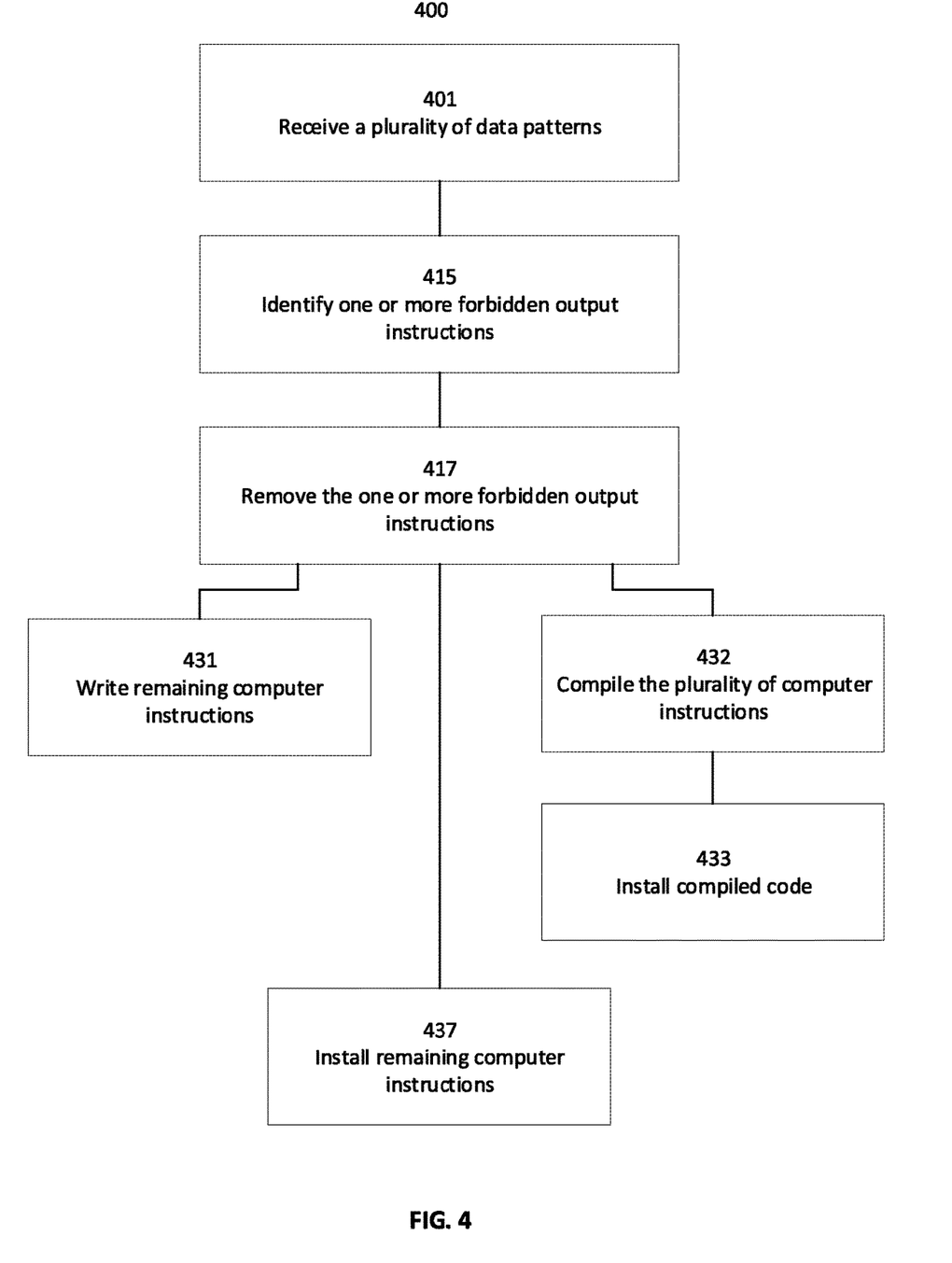
FIG. 4 is a flow chart schematically representing an optional flow of operations, according to some embodiments of the present invention.

Reference is now made also to FIG. 4, showing a flow chart schematically representing an optional flow of operations 400, according to some embodiments of the present invention. In such embodiments, installer 201 is adapted receive in 401 a plurality of data patterns, each comprising at least one data field identifier selected from a set of protected data field identifiers of at least one data repository 103, at least one output target, and an access instruction. Optionally, each of the plurality of data patterns is a JavaScript Object Notation (JSON) object. An example of a protected data field identifier is a data field identifier identifying one of: a patient name, an address, a Social Security number, a passport number, a national identification number, an electronic mail address, a telephone number, a fingerprint, a photographic image, a medical record, a bank account identifier, and an amount of money. Optionally, the set of protected data field identifiers comprises at least one data field identifier identifying at least one type of protected health information according to HIPAA security regulations. Examples of an output target are a value of a file name, a template value of a filename comprising at least one variable file name element, a value of a network address, a template value of a network address comprising at least one variable network address element, and a display device identifier.

In 415, installer 201 optionally identifies in the plurality of output instructions one or more forbidden output instructions by matching one or more reaching definitions of some of the plurality of computer instructions with one or more of the plurality of data patterns.

Figure 5:
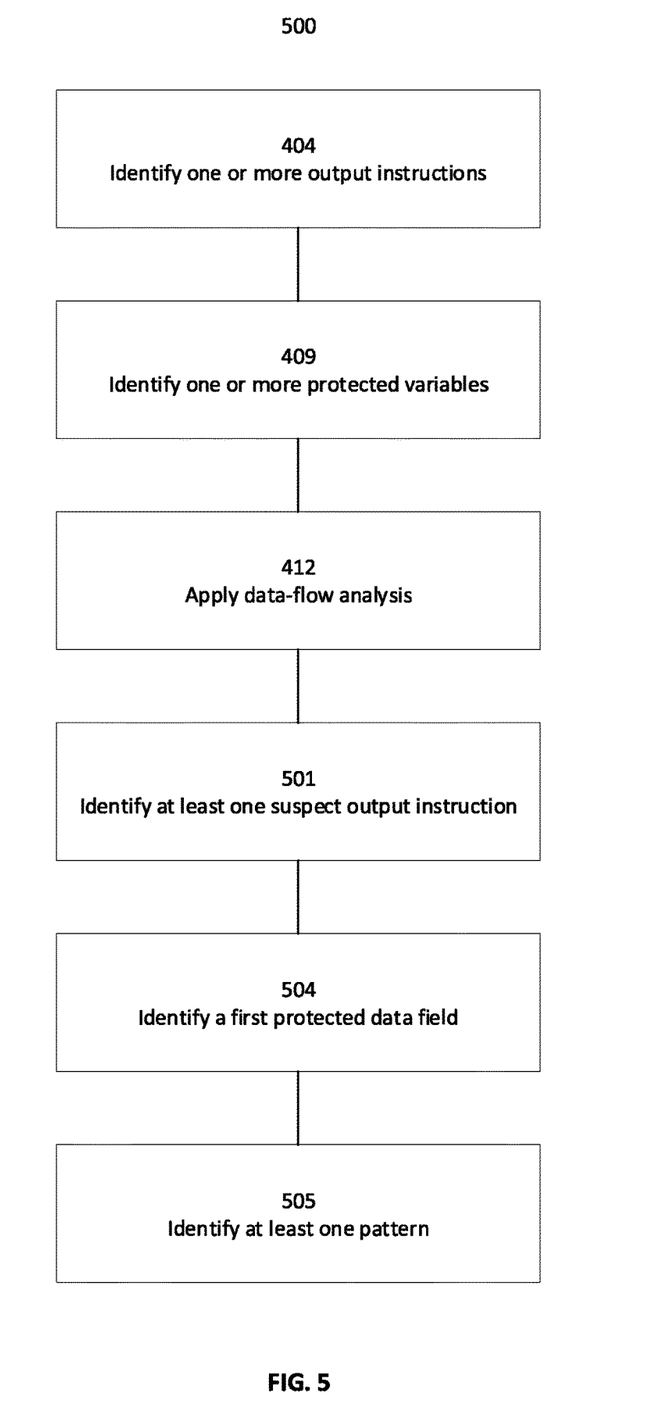
FIG. 5 is a flow chart schematically representing an optional flow of operations for identifying one or more forbidden output instructions, according to some embodiments of the present invention.

Reference is now made also to FIG. 5, showing a flow chart schematically representing an optional flow of operations 500 for identifying one or more forbidden output instructions, according to some embodiments of the present invention. In such embodiments, in 404 installer 201 optionally identifies in a plurality of computer instructions of the data management software one or more output instructions each having an instruction output target, and in 409 installer 201 optionally identifies in the plurality of computer instructions one or more protected variables having a value assigned by reading a protected data field from at least one data repository 103.

Optionally, installer 201 applies in 412 data-flow analysis to the plurality of computer instructions to identify for at least one of the one or more output instructions one or more reaching definitions comprising at least one of the one or more protected variables, and in 501 installer 201 optionally identifies at least one suspect output instruction in the at least one of the one or more output instructions having one or more reaching definitions comprising at least one of the one or more protected variables, wherein the at least one suspect output instruction has a first instruction output target, for example entity 102, and the at least one suspect output instruction's one or more reaching definitions has a first protected variable, for example a variable assigned a value by reading at least one data identifier 311 from data repository 103. Optionally, in 504 installer 201 identifies a first protected data field read to assign a value to the first protected variable, for example at least one data identifier 311, and in 505 installer 201 optionally identifies in the plurality of data patterns at least one data pattern, for example data pattern 300, having an output target, for example at least one output target 312, matching the first instruction output target according to a target matching test and a data field identifier, for example data field identifier 311, matching the first protected data field according to a variable matching test. An example of a target matching test is a comparison between a string value of the first instruction output target and a string value of the output target of the at least one data pattern. An example of a variable matching test is a comparison between a string value of the first protected data field's data field identifier and a string value of the at least one data pattern's at least one data field identifier.

When the at least one data pattern's access instruction, for example access instruction 313, forbids access from the first output target to the first protected data field, installer 201 optionally identifies a forbidden output instruction in 505.

Optionally, each data pattern of the plurality of data patterns has a priority. Optionally, installer 201 applies the target matching test and the variable matching test to some of the plurality of data patterns, in ascending or descending order of data pattern priority. Optionally, installer 201 implements a policy resolution method as known in the industry to identify whether the at least one suspect output instruction is a forbidden output instruction according to the plurality of data patterns.

Reference is now made again to FIG. 4. When one or more forbidden output instructions are identified, installer 201 optionally removes the one or more forbidden output instructions from the plurality of computer instructions. Optionally, installer 201 writes in 431 the plurality of computer instructions remaining after removing the one or more forbidden output instructions to storage 202.

Optionally, the plurality of computer instructions are in a human readable programming language. Examples of a human readable programming language are Java, JavaScript, C, C++, C#, Perl, Tcl, and Python. In some embodiments, in 437 installer 201 installs the plurality of computer instructions remaining after removing the one or more forbidden output instructions on data manager 101, for example when the plurality of computer instructions are in an interpreted programming language such as JavaScript or Python. Optionally, for example when installer 201 executes an automated build environment, installer 201 implements steps 401, 415, and 417 as a processing component of the automated build environment. Optionally, step 437 is implemented as another processing component of the automated build environment. Optionally, step 437 is implemented as a processing component of a software deployment tool executed by installer 201.

Optionally, in 432 installer 201 compiles the plurality of computer instructions remaining after removing the one or more forbidden output instructions to produce compiled code, for example when the plurality of computer instructions are in a compiled programming language such as C or C#. Optionally, the compiled code comprises a plurality of machine language computer instructions, optionally in binary format. Optionally, the compiled code comprises a plurality of intermediate language computer instructions, for example Java bytecode or register transfer language. Optionally, for example when installer 201 executes a software development environment, installer 201 implements steps 401, 415, and 417 as a compiler plugin of a compiler of the software build environment. Optionally, step 432 is executed by a compiler of the software development environment. Optionally, in 433 installer 201 installs the compiled code on data manager 101. Optionally, step 433 is implemented as a processing component of a software deployment tool executed by installer 201.

Optionally, installer 201 outputs a message instructing a user of system 200 to install secure data management software comprising the plurality of computer instructions remaining after removing the one or more forbidden instructions on data manager 101. The secure data management software may be the plurality of computer instructions remaining after removing the one or more forbidden instructions. The secure data management software may be the compiled code. Optionally, installer 201 outputs the message to display device 203. Optionally, installer 201 outputs the message to a data communication network via at least one data communication interface 204, for example by sending an electronic mail message to an electronic mail address of the user. In some embodiments of the present invention, installer 201 sends the secure data management software to another hardware processor via at least one data communication interface 204, for example for the purpose of storing the secure data management software in a remote location such as a remote software repository.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant protected data identifiers will be developed and the scope of the term protected data identifier is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for producing secure data management software, comprising at least one hardware processor adapted to:
    receive a plurality of data patterns, each comprising at least one data field identifier selected from a set of protected data field identifiers of at least one data repository, at least one output target, and an access instruction;
    identify in a plurality of computer instructions of the data management software one or more forbidden output instructions by matching one or more reaching definitions of some of the plurality of computer instructions with one or more of the plurality of data patterns; and
    remove the one or more forbidden output instructions from the plurality of computer instructions.

2. The system of claim 1, wherein identifying the one or more forbidden output instructions comprises:
    identifying in the plurality of computer instructions one or more output instructions each having an instruction output target;
    identifying in the plurality of computer instructions one or more protected variables having a value assigned by reading a protected data field from the at least one data repository;
    applying data-flow analysis to the plurality of computer instructions to identify at least one reaching definition of at least one of the one or more output instructions, each identified reaching definition comprising at least one of the one or more protected variables;
    identifying at least one suspect output instruction in the at least one of the one or more output instructions having at least one reaching definition comprising at least one of the one or more protected variables, wherein the at least one suspect output instruction has a first instruction output target and the at least one suspect output instruction's at least one reaching definition has a first protected variable;
    identifying a first protected data field read to assign a value to the first protected variable; and
    identifying in the plurality of data patterns at least one data pattern having an output target matching the first instruction output target according to a target matching test and a data field identifier matching the first protected data field according to a variable matching test;
    wherein the at least one data pattern's access instruction forbids access from the first output target to the first protected data field.

3. The system of claim 1, wherein the at least one hardware processor is further adapted to write the plurality of computer instructions remaining after removing the one or more forbidden output instructions to a digital storage connected to the at least one hardware processor.

4. The system of claim 1, wherein the plurality of computer instructions are in a human readable programming language.

5. The system of claim 4, wherein the at least one hardware processor is further adapted to compile the plurality of computer instructions remaining after removing the one or more forbidden output instructions to produce compiled code comprising a plurality of machine language computer instructions or a plurality of intermediate language computer instructions.

6. The system of claim 5, wherein the at least one hardware processor is further adapted to install the compiled code on at least one other hardware processor of a data management system.

7. The system of claim 6, wherein the at least one other hardware processor executes at least one virtual machine.

8. The system of claim 6, wherein the at least one other hardware processor is connected to the at least one data repository via at least one other data communication network.

9. The system of claim 1, wherein the at least one hardware processor is further adapted to install the plurality of computer instructions remaining after removing the one or more forbidden output instructions on at least one other hardware processor of a data management system.

10. The system of claim 9, wherein the at least one other hardware processor executes at least one virtual machine.

11. The system of claim 9, wherein the at least one other hardware processor is connected to the at least one data repository via at least one other data communication network.

12. The system of claim 1, wherein the at least one target is a member of a group consisting of: a file name value, a file name template value comprising at least one variable file name element, a network address value, a network address template value comprising at least one variable network address element, and a display device identifier.

13. The system of claim 1, wherein the at least one data field identifier is a member of a group consisting of: an attribute identifier in a relational database table, a key identifier, a column identifier, a document name value, and a document name template value comprising at least on variable document name element.

14. The system of claim 1, wherein the set of protected data field identifiers comprises at least one data field identifier identifying at least one type of protected health information according to Health Insurance Portability and Accountability Act of 1996 (HIPAA) security regulations.

15. The system of claim 1, wherein the set of protected data field identifiers comprises at least one identifier identifying at least one of a group consisting of: a patient name, an address, a Social Security number, a passport number, a national identification number, an electronic mail address, a telephone number, a fingerprint, a photographic image, a medical record, a bank account identifier, and an amount of money.

16. The system of claim 1, wherein the at least one data repository comprises a database.

17. The system of claim 1, wherein the at least one hardware processor receives the plurality of data patterns via a data communication network interface connected to the at least one hardware processor or by reading the plurality of data patterns from a digital storage connected to the at least one hardware processor.

18. A computer implemented method producing secure data management software, comprising:
    receiving a plurality of data patterns, each comprising at least one data field identifier selected from a set of protected data field identifiers of at least one data repository, at least one output target, and an access instruction;
    identifying in a plurality of computer instructions of the data management software one or more forbidden output instructions by matching one or more reaching definitions of some of the plurality of computer instructions with one or more of the plurality of data patterns; and
    removing the one or more forbidden output instructions from the plurality of computer instructions.

19. A software program product for producing secure data management software, comprising:
    a non-transitory computer readable storage medium;
    first program instructions for receiving a plurality of data patterns, each comprising at least one data field identifier selected from a set of protected data field identifiers of at least one data repository, at least one output target, and an access instruction;
    second program instructions for identifying in a plurality of computer instructions of the data management software one or more forbidden output instructions by matching one or more reaching definitions of some of the plurality of computer instructions with one or more of the plurality of data patterns; and
    third program instructions for removing the one or more forbidden output instructions from the plurality of computer instructions;
wherein the first, second, and third program instructions are executed by at least one computerized processor from the non-transitory computer readable storage medium.

* * * * *